United States Patent [19]
Brown

[11] 4,146,479
[45] Mar. 27, 1979

[54] MAGNETIC WATER CONDITIONER

[76] Inventor: Merritt J. Brown, 813 Hastings Dr., Kissimmee, Fla. 32741

[21] Appl. No.: 817,022

[22] Filed: Jul. 19, 1977

[51] Int. Cl.² .......................................... B01C 35/06
[52] U.S. Cl. ..................................... 210/222; 210/85
[58] Field of Search .............................. 210/222, 223

[56] References Cited

U.S. PATENT DOCUMENTS

| | | | |
|---|---|---|---|
| 2,652,925 | 9/1953 | Vermeiren | 210/222 |
| 2,678,729 | 5/1954 | Spodig | 210/222 |
| 2,825,464 | 3/1958 | Mack | 210/222 |
| 3,170,871 | 2/1963 | Moriya | 210/222 |
| 3,669,274 | 6/1972 | Happ et al. | 210/222 |
| 3,762,135 | 10/1973 | Ikebe | 210/223 X |
| 3,923,660 | 12/1975 | Kottmeier | 210/222 |
| 3,951,807 | 4/1976 | Sanderson | 210/222 |

FOREIGN PATENT DOCUMENTS 190368  2/1966  U.S.S.R. ................................ 210/222

*Primary Examiner*—John Adee
*Attorney, Agent, or Firm*—Roger L. Martin

[57] ABSTRACT

A magnetic water conditioner has a hollow casing with an array of disc type cylindrical magnets arranged coaxially in the casing to provide an annular magnetic treatment zone in the space between the casing and the array. The magnets are polarized along diameters and have pole faces at their lateral surfaces, the magnets being rotatable about the axis of the array to various fixed positions that enable determination of the best field arrangement, all without any structural changes in the design of the conditioner. A plastic housing for the array provides parallel flow channels in the treatment zone, and which are all traversed by water fed to the zone by virtue of return passageways provided by molded end caps that also have openings which provide the inlet and outlet to the treatment zone.

12 Claims, 13 Drawing Figures

MAGNETIC WATER CONDITIONER

BACKGROUND OF THE INVENTION

The invention relates to magnetic water conditioners and more particularly to water conditioners that utilize permanent magnets for the generation of the magnetic fields.

It is known that the magnetic treatment of calcarious waters which deposit scales or encrustations on heat exchange and conduit surfaces serves to minimize the scale forming problems associated with the handling of such waters. It is also known that such treated waters also exhibit tendencies to remove previously deposited scales from surfaces encountered by the untreated waters.

The mechanisms involved in such magnetic treatments are the subject of much speculation and various theories have been advanced to provide a semblance of accountability for the benefits derived. Among the theories are those which advance the thought process that the encrustation forming components of the calcarious waters are polarized and that the treatment with the magnetic flux field so increases the mobility of the components that they are neutralized through encounter with oppositely charged water components or through electron exchange upon encountering the conduit surfaces. Other theories seemingly recognize an induced polarization effect that contributes to some type of galvanic action or the formation of non-encrustating molecular complexes.

The applicant is uncertain as to which, if any, of the advocated mechanisms is correct for it appears that there is no known reliable quantitative procedure which is available to prove or disprove the mechanisms much less to provide a semblance of predictability as to the benefits that will be attained by any particular design of magnetic water conditioner.

There is a current trend toward the modification of air cooled refrigeration systems such as encountered in home air conditioning units, so as to utilize evaporative cooling principles. This trend, of course, is occasioned by the current energy crisis. The modifications basically amount to providing attachments which serve to direct a spray of water onto the condenser coils or comparable heat exchange surfaces of the unit. The amounts of water utilized must, from necessity, be relatively small in comparison to those used in more sophisticated refrigeration systems that utilize the evaporative cooling principles for such systems are usually designed for the recycled use of the water coolant. On the other hand, conventional air cooled refrigeration units are incapable of using recycled coolant principles without expensive modifications and any excess water used for evaporative cooling purposes must either be passed to a drain system or, alternatively, permitted to dissipate through ground absorption in the immediate vicinity of the refrigeration unit.

With the small amounts of water utilized for evaporative cooling purposes, the water flow over the condenser coils of air cooled refrigeration units is, of course, minimal. As a result, there is an ideal condition presented for the formation of scales and encrustations unless the water is pretreated to either remove or modify the encrustation forming factors or components of the source water utilized.

Throughout the United States, the waters which are available for evaporative cooling purposes vary greatly in composition and character, and while the magnetic treatments of waters appear to minimize the scale forming problems, the current water conditioners available for such purposes are expensive and are so designed as to be incapable of evaluation in the treatment of different waters except at the design flow capacity of the conditioner. Thus, at the low flow requirements for conditioners used in modifying air cooled refrigeration units, the conditioners often have a capacity much exceeding that required for the water being treated. The fixed design of the unit, in the absence of quantitative means for predicting the results of design modifications, makes it virtually economically impossible to re-design for the less demanding capacities because of the empirical nature of the evaluation tests that must be run on each water to be encountered.

The prior art having to do with water conditioners utilizing permanent magnets advocates the use of everything from simple elongated bar magnets which are polarized along their longitudinal axes, to cylindrical discs that are polarized along their diameters. In some instances, elongated bar magnets that are polarized along their diameters have been advocated, and the facial polarization of disc type magnets along their axes of symmetry has also been advocated. Apart from the various different types of permanently magnetized structures and the various arrangements that have been advocated for water conditioners, the prior art also seems to advocate everything from flow parallel to the polar axes of the magnets to flow which is perpendicular to the polar axes, and various complicated and expensive structural arrangements have been advocated to provide the flow path seemingly desired. These prior art arrangements for providing the seemingly desired flow paths relative to the flux fields are not only expensive to incorporate in commercial designs for water conditioners, but they lead to a practical inability to economically effectuate design modifications for varying capacity conditions.

There is a need accordingly, for water conditioning units which are effective for their intended purpose and which are simple in design and economical to manufacture. There is also a need to provide a basic design for a water conditioning unit and which is subject to ready variance in its application of the flux fields to the water being treated so as to enable establishment of the best operating design parameters for the unit under any one set of water treatment operating conditions.

SUMMARY OF THE INVENTION

The inventor utilizes small, preferably cylindrical disc shaped permanent magnets which are polarized along a diametric dimension of the magnet so that the opposite pole faces face radially outwardly at the lateral surfaces of the magnets. The magnets are preferably cylindrical in shape and with diameters that exceed their height dimensions, and a plurality of the magnets are assembled in an end-to-end coaxial arrangement that provides an elongated array or assembly in which the polar axes of the respective magnets are normal to the longitudinal axis of the elongated array. As will be subsequently seen, this approach to establishing the magnetic field encountered in the water conditioner facilitates a substantial field variance capability within the water conditioning unit, and without any structural changes in the physical design dimensions of the unit. The approach accordingly enables the evaluation of the design so as to arrive at optimum flux field arrangement for determining the maximum capacity of the unit for any one type of calcarious water contemplated for treatment.

To establish a path of flow for the water through the conditioner and which will permit comparative evaluations of the treatments accorded the waters by different polar arrangements of the magnets, the inventor houses the array of magnets in a hollow form fitting extruded component or member that has a preferably cylindrical sheath which surrounds the magnets and which is provided with circumferentially spaced apart and radially protecting elongated ribs that serve to channel the flow of the fluid through the water conditioning unit. At the opposite ends of the array housing, the end openings of the sheath are covered by end caps that are designed to provide the fluid inlet and discharge outlet to the magnetic treatment zone of the water conditioner. These end caps are also designed to provide return passageways that communicate with the ends of adjacent channels that are provided by the rib structure, and the arrangement is such that the flow of fluid through the magnetic treatment zone in the adjacent channels is in parallel with the axis of the magnetic array but in opposite parallel directions in the adjacent channels. The end caps and ribbed sheath members of the array housing are formed from non-magnetic materials having a low permeability and are preferably formed from one of the well known extrudable and/or moldable thermoplastic materials so as to avoid short circuiting of the magnetic fields generated by the magnetic array.

The magnets of the array are preferably annular, and the housing end caps are also preferably provided with apertures that are axially aligned with the center openings of the magnets. This facilitates the use of an elongated fastener that extends through the coaxially arranged openings in clamping the magnets between the end caps. This elongated fastener may be made from material such as aluminum or brass, but it is preferably made from ferromagnetic material having a greater permeance than that of the magnets so as to provide a short circuit for the magnetic flux in the aperture area of the annular magnets of the array.

The assembled housing for the magnetic array is designed so that the cylindrical side wall of the end caps together with the lateral edges of the ribs fall in the lateral surface area of a right, circular cylinder having a diameter that is substantially equal to the inside wall diameter of a conventional pipe section so that the assembly can be readily inserted in the pipe section. With this arrangement, the inner cylinder wall of the pipe section serves to close the open channels of the rib structure and thus cooperate in providing an elongated flow passage through the magnetic treatment zone of the conditioner. The pipe section is preferably made of ferromagnetic material, and may be a section of conventional iron pipe so as to provide a return path for the flux generated by the array of magnets, as will be subsequently seen.

The housing may be retained in position in the pipe section and restrained from axial movement by any suitable means, and it is conveniently retained in position through the use of conventional end caps that are provided with suitable threaded openings for use in coupling the conditioner to delivery and discharge conduits used in feeding and conveying the water to and from the treating units.

As will be subsequently seen, the annular magnets of the array in a test unit may be arranged so that their polar axes are in parallel or may be arranged so that their polar axes are angularly arranged relative to one another along the longitudinal axis of the assembly. This facilitates a determination as to the optimum arrangement for the magnets in order to secure the most benefit from the generated flux fields. With this type of arrangement of the magnets, not only can the optimum flux field arrangement be determined for a pre-determined flow rate of a fluid being treated, but the optimum number of magnets and the length of the array can be determined for each type water being evaluated. With this information, the design of a water conditioner utilized in a given area having a common water source, can be tailored to the available source water in the area. Once the design has been established for the source water, the conditioners utilized in the source area may embody an array of magnets that are so oriented in accord with the design determined by the evaluations and which are arranged in positions which are fixed relative to the other by the simple use of adhesive materials along the parting lines between the adjacent magnets of the array.

A general objective of the invention is to provide an improved water conditioner or water treating device that utilizes a magnetic flux field in the treatment and which is generated through the use of permanent magnets. Still a further objective of the invention is to provide a basic structural design for the magnetic treatment of water in a conditioner and which permits one to vary the magnetic field applications to the water being treated and without a variance in the overall physical structure of the water conditioner. Yet another objective is to provide a basic structural design for water conditioners which, without a physical change in the structural design of the conditioner, is capable of being adjusted to provide a variance in the magnetic field application and to the end that the optimum magnetic field orientation at any given capacity can be ascertained for any given water to be treated. Still a further objective of the invention is to provide a water conditioning unit which can be made from low cost materials and which can be readily and economically assembled for use. Yet a further objective is to provide a water conditioning unit having a design that can be effectively evaluated to determine its capacity and optimum arrangement of its flux field in the treatment of different calcarious waters, and to the end that one can predict the optimum flux field arrangement for the capacity flow through the unit so that the number of units required to treat larger volumes of the calcarious waters can be predicted on the basis of the established design determination. Other and further objects will become apparent from the description which follows.

DESCRIPTION OF THE DRAWINGS

The novel features which are believed to be characteristic of this invention are set forth with particularity in the apended claims. The invention itself however, both as to its organization and method of operation, together with further objects and advantages thereof, may best be understood by reference to the following description taken in connection with the accompanying drawings in which:

DESCRIPTION OF THE INVENTION

Figure 1:
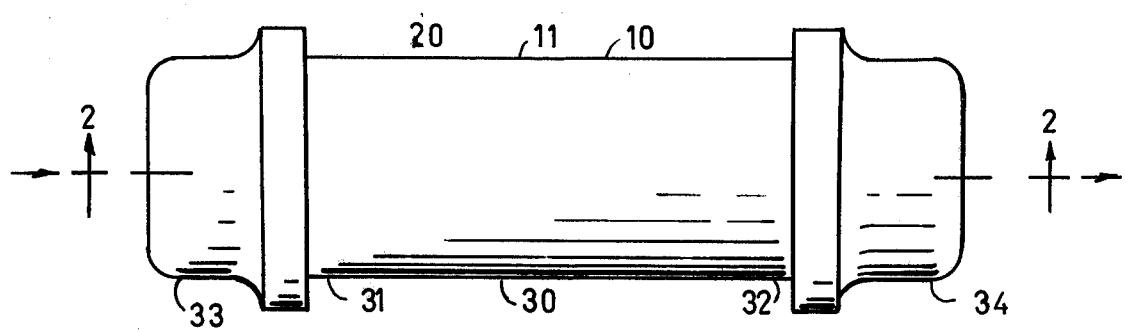
FIG. 1 is a plan view of a magnetic water conditioner embodying the principles of the invention.
Figure 2:
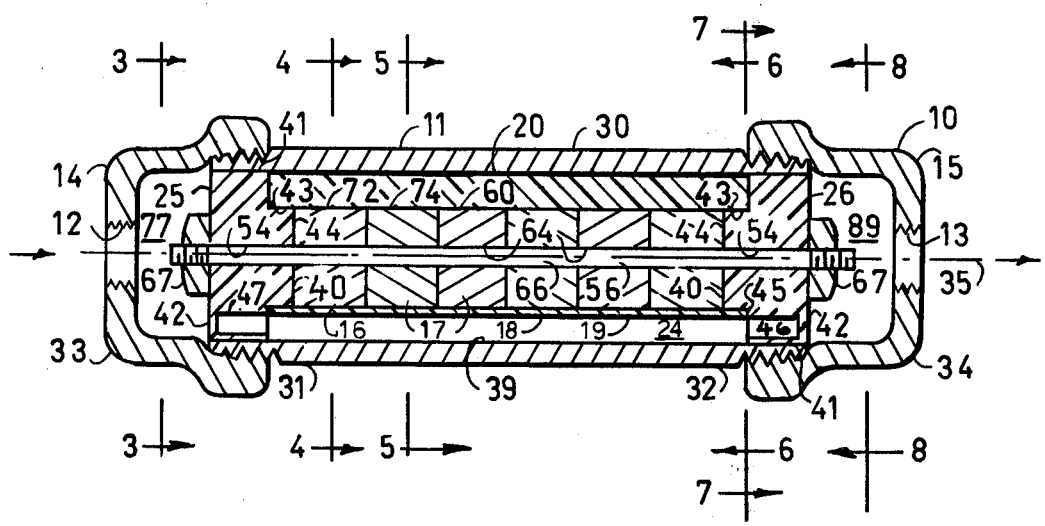
FIG. 2 is a longitudinal elevational sectional view taken generally along the lines 2—2 of FIG. 1.
Figure 3:
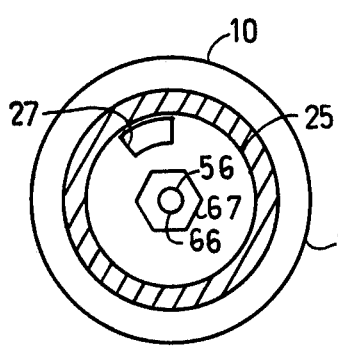
FIG. 3 is a transverse sectional view along the lines 3—3 of FIG. 2.

Reference is now made to an embodiment of the invention as illustrated in FIGS. 1 and 2 and wherein a magnetic water conditioner embodying the principles of the invention is designated at 10.

The conditioner includes an elongated outer casing or shell 11, that has fluid inlet and outlet ports 12 and 13, at its opposite ends 14 and 15. Within the hollow casing 11, the conditioner 10 has an elongated array or assembly 16 of cylindrical disc-like annular magnets 17 which are arranged coaxial with the longitudinal axis 35 of the casing 11. The magnets 17 of the elongated array 16 are spaced apart from the inner wall 39 of the casing to provide an annular water treatment zone designated at 24 and the array is contained in a housing designated at 18. This housing 18 includes an elongated extruded hollow component 19 that forms a cylindrical sheath around the array 16. The extruded component 19 has a plurality of elongated radially projecting ribs 20 that are circumferentially spaced apart and integrally joined to the hollow sheath 22. The ribbed arrangement of the extruded component 19 provides a plurality of elongated parallel flow channels 23 (FIG. 9) in the annular magnetic treatment zone 24 between the end caps 25 and 26.

The end caps 25 and 26 are identical in structure and are molded plastic components that provide the inlet and discharge openings 27 and 28 to the magnetic treatment zone 24. These caps are arranged to pass fluid between adjacent channels so that the path of fluid flow is such that the fluid traverses each channel surrounding the array in passing from the inlet to outlet of the magnetic fluid treatment zone and flows in opposite directions in adjacent channels.

The outer casing 11 includes an open ended cylindrical pipe section 30 that is externally threaded at its opposite ends 31 and 32. Here the casing has end caps 33 and 34 that are threadedly engaged on the opposite ends of the pipe section 30. Caps 33 and 34 are equipped with threaded openings 12 and 13 that are aligned in the assembly conditioner so as to facilitate a coupling of the conditioner 10 into a line for the water to be treated.

Figure 9:
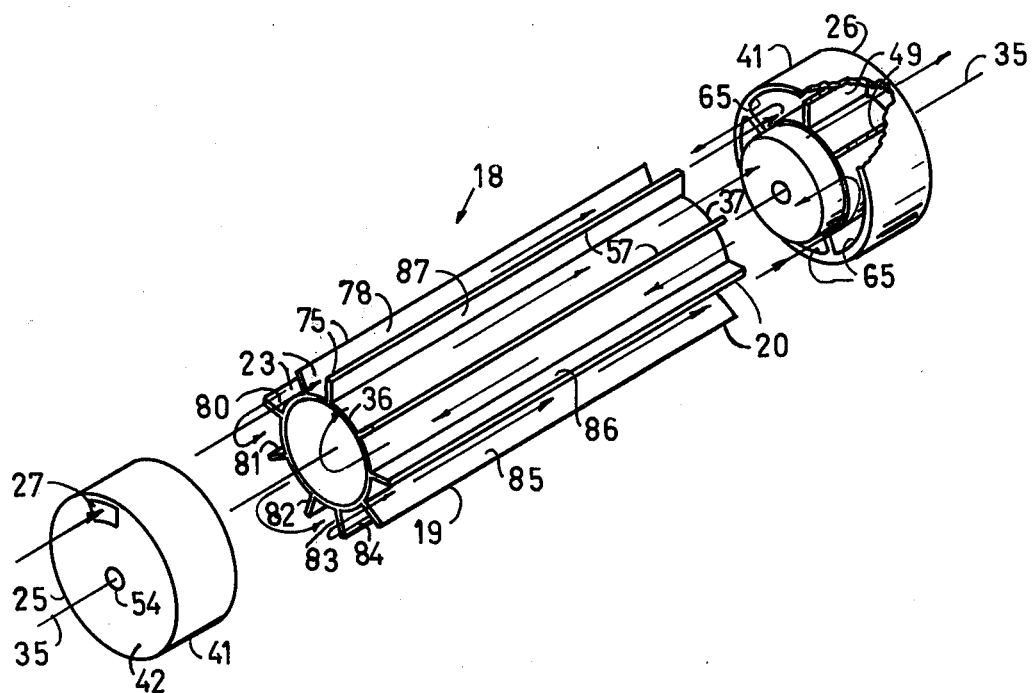
FIG. 9 is an exploded view of the housing components for the magnetic array and diagramatically illustrates the path of flow through the magnetic treatment area of the water conditioner.
Figure 6:
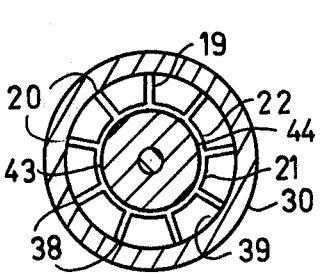
FIG. 6 is another transverse sectional view taken along the lines 6—6 of FIG. 2.

The housing 18 for the magnet array 16 includes the extruded plastic end caps 25 and 26. The extruded component 19 includes the elongated hollow open ended right cylindrical sheath section 22 and a plurality of rib sections 20 which are integrally formed with the sheath 22 during the extrusion process. The array fits in the sheath with its lateral surface 29 contiguous with the cylindrical inner wall of the sheath. The ribs 20, as evident from FIGS. 6 and 9 are circumferentially spaced apart at the perimeter 21 of the sheath 22 and project radially outwardly of the lateral surface 21 of the sheath. The elongated ribs are arranged longitudinally and in parallel with the axis 35 of the sheath 22 and the extruded component 19. In the embodiment illustrated, the rib members are coextensive in length and extend between the opposite ends 36 and 37 of the cylindrical sheath section. As seen in FIGS. 6, the outer edges 38 of the ribs 20 fall in the lateral surface area of a right cylinder having a diameter that is substantially equal to the diameter of the internal wall 39 of pipe section 30 so that in the assembled condition (FIG. 2) wall 39 closes the open channels 23 that, as seen in FIG. 9, are provided by the rib arrangement.

The end cap members 25 and 26 of the housing 18 are identical in structure in the illustrated embodiment. These end caps are formed by molding procedures from nonmagnetic plastic materials that have a low permeability and each cap has a cylindrical lateral wall section 41 that is integrally joined with a circular outer end wall section in the molding process. The lateral wall section 41 has an exterior diameter that is substantially equal to the internal diameter of the pipe section 30 so that a close contiguous fit between the lateral wall section 41 and cylindrical inner wall 39 of the pipe section 30 is attained when the assembled housing 18 is inserted in the pipe section. Wall section 41, as evident in the drawings, is annular in shape. End wall 42 is equipped with a cylindrical boss section 43 which is coaxially arranged and extends through the opening in the annular lateral wall section 41. This boss section 43 has an end portion 44 that is offset from the end wall 42 and which has a reduced diameter so that it will snugly fit into one of the opposite end openings in the hollow sheath 22. This arrangement provides an annular shoulder 45 that abuts the annular end of the sheath in the assembled housing.

Figure 7:
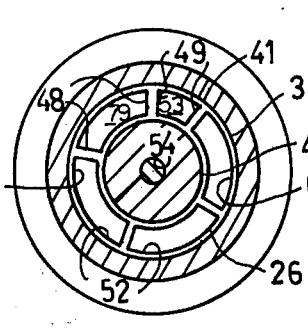
FIG. 7 is another transverse sectional view taken along the lines 7—7 of FIG. 2.

In the annular space 46 between the enlarged boss portion 47 and the internal surface of the lateral wall section 41, the end caps are provided with radially projecting web sections 48 (FIG. 7) that are arranged for end alignment with certain of the ribs in the extruded member. These webs 48 are integral with the boss enlargement 47 and with the end wall and lateral wall sections 42 and 41 respectively. As seen in FIGS. 7 and 9, each end cap has a pair 49 of these webs 48 that are circumstantially spaced apart and arranged for end alignment with an adjacent pair of the ribs 20 of the extruded component 19 when the housing is assembled. Thus, the pair 49 of webs of end cap 26 as seen in FIG.

9 arranged for alignment with the ends of the pair of ribs designated at 57. Here, each end cap is provided with an opening in the end wall section 42 end which communicates with the space 53 between the pair of webs to serve either as the inlet or outlet opening 27 or 28 to the magnetic treatment zone depending on the upstream or downstream location of the end cap in the assembled housing 18.

The remainder of the webs 48 in the end cap components of the housing are also circumstantially spaced apart and arranged for end alignment with the ribs. Here, however, the angular spacing is twice that between the ribs 20. This provides return passageways 65 in the cap structure with the spaces 52 on each side of the remaining webs providing a return passage in the housing and which communicates with adjacent flow channels 23 in the extruded component 19.

In the assembled housing, fluid inlet and outlet openings in the opposite end caps 25 and 26 communicate with respectively adjacent channels in the extruded component 19 so that flow of the fluid through the magnetic treatment zone 24 is in opposite directions in adjacent channels as the fluid traverses the path (shown by arrows in FIG. 9) between the inlet and outlet openings 27 and 28 of the assembled housing.

Each cap also has an axial opening or hole 54 that extends through the boss 43 and end wall section 42 for receiving the fastener 56 utilized in the assembled conditioner 10.

The array 16 comprises a plurality of preferably cylindrical magnets 17 which have a height dimension less than their diameter and which are polarized along the diametric dimension of the structures. This provides exteriorly facing pole faces 59 and 60 of opposite polarities and which are located at diametrically opposite sides of the lateral side surface 61 of each magnet. The diameters of the magnets 17 are substantially equal to the diametric dimension of the cylindrical internal wall surface 63 of the sheath 22 so that surfaces 63 and 61 are contiguous. In the array 16, the magnets 17 are contiguous and assembled in an end-to-end relation, being clamped in their positions between the reduced end portions 44 of the opposite end caps 25 and 26 by the fastener 56 and with the inner ends of the bosses in facial contact with the opposite ends 40 of the array.

As seen in the drawings, the cylindrical magnets 17 each have a hole 64 that in the assembled conditioner is axially arranged and aligned with those of the other magnets and with the holes 54 in the end cap members. These aligned holes 64 and 54 are adapted to receive the fastener 56 that, in the embodiment shown, comprises an elongated rod 66 which is provided with end threads and equipped with end nuts 67 that are threaded on the opposite ends of rod 66 to facilitate clamping the magnets 17 together between the end caps as shown in the drawings. The magnets may be simply held in position by the clamping arrangement or may be glued together in the array by a suitable adhesive if the field orientation has been established.

As previously indicated, the extruded component 19 and end caps 33 and 34 are preferably made of non-magnetic or low permeable plastic materials whereas rod 66 is made of ferromagnetic material so as to provide a highly permeable path across the hole 64 in the annular magnets. The pipe section 30 is also made of highly permeable material, preferably wrought iron, so as to provide a return path for the flux passing from the north pole face 59 of each magnet across the air gap in the magnetic treatment zone to the pipe section 30 and thence back across the air gap in the channel areas of the zone 24 to the other pole face 60 of the magnet.

The individual magnets may be made from alnico or other suitable permanently magnetizable material. Included among such permanently magnetizable materials may be the well known ferrites such as barium ferrite. In particulate form the ferrites may be extruded or cast in a matrix of plastic material and magnetically oriented along the desired polar axis prior to the hardening of the plastic matrix, as is well known in the art. Such magnets are then permanently polarized in a strong magnetic field along the grain oriented direction attained during the forming procedure.

Figure 10:
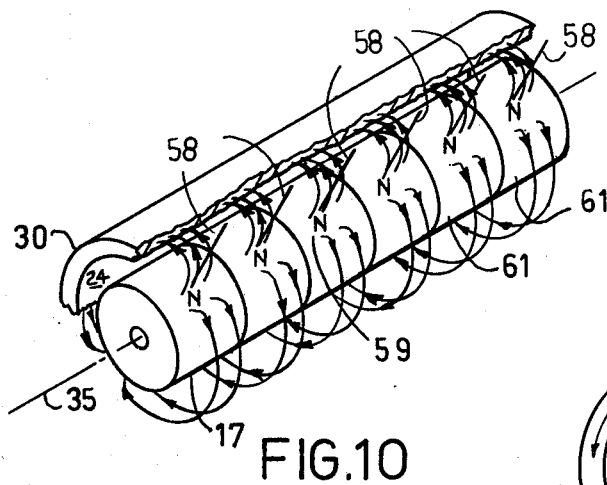
FIG. 10 is an isometric illustration of one arrangement of the magnets in the array as seen in conjunction with a fragment of the pipe section to illustrate one flux field arrangement attainable.
Figure 11:
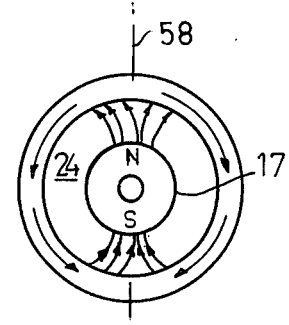
FIG. 11 is an end view of one magnet in the array as seen in conjunction with the pipe section and illustrates the flux field and the polar axis of the magnet.

FIG. 10 illustrates one arrangement for the polar axes of the array of magnets 17, and wherein the polar axes 58 of the respective magnets 17 are all arranged in parallel and normal to the longitudinal axis 35 of the magnetic assembly. This arrangement is comparable to the use of an elongated bar magnet that is polarized throughout its entire length along a documetric dimension and it tends to concentrate the flux fields at diametrically opposite side locations in the annular magnetic treatment area 24, as generally depicted in FIG. 11.

Figure 12:
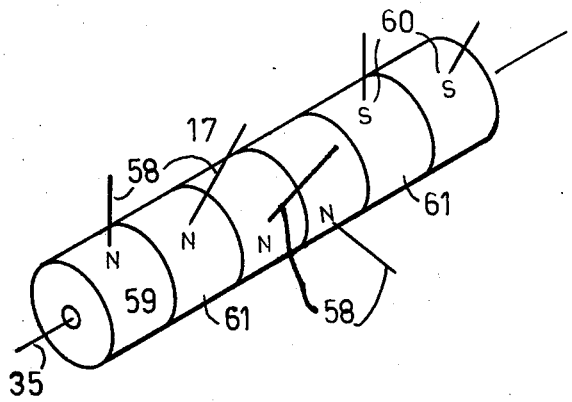
FIG. 12 is an isometric illustration of yet another arrangement of the magnets in the array and illustrates an arrangement of the magnets for attaining a generally helical flux field between the opposite ends of the array.

In the preferred practice of the invention, the polar axes 58 of adjacent magnets 17 of the array 16 are angularly arranged with respect to each other and preferably in an arrangement such that the like poles of adjacent magnets are uniformly rotated from one end to the other end of the array as seen in FIG. 12. In this arrangement, the flux field traversing the air gap in the magnetic treatment area provide a generally helically arranged resultant magnetic field extending from one end to the other end of the array. This is preferred for it provides a flux field of the maximum intensity, commensurate with the materials of construction of each magnet in each channel area.

Figure 4:
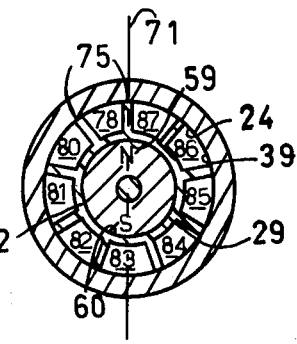
FIG. 4 is a transverse sectional view taken along the lines 4—4 of FIG. 2.
Figure 5:
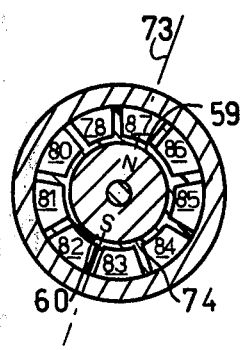
FIG. 5 is a transverse sectional view similar to FIG. 4 but taken through an adjacent magnet along the lines 5—5 of FIG. 2.
Figure 8:
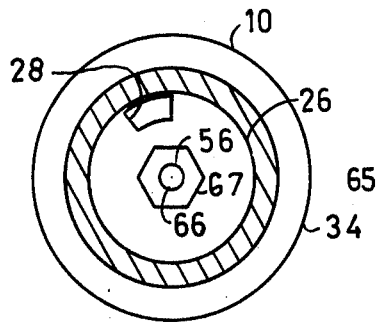
FIG. 8 is a transverse sectional view taken along the lines 8—8 of FIG. 2, and which is similar to FIG. 3 but which nevertheless, illustrates the arrangement of the outlet from the magnetic treatment zone as compared to the arrangement of the inlet to the zone as shown in FIG. 3.

The preferred annular arrangement of the polar axes 58 of adjacent magnets in the embodiment depicted in FIG. 2 is best shown in FIGS. 4 and 5 and where it will be noted that the polar axes 71 of the feed end magnet 72 (FIG. 4) of the array 16 is angularly displaced from the polar axis 73 of the magnet 74 next adjacent thereto in the array.

The flow path traverse in conditioner 10 is best illustrated in FIG. 9 and by reference to FIGS. 2, 4, and 5 and wherein the water to be treated is fed as indicated by arrow 76 (FIG. 2) through the fluid inlet port 12 of conditioner 10 and into an inlet chamber 77 that is defined by the exterior wall of end cap 25 and the interior wall of end cap 33. From the inlet chamber 77 the fluid progresses through the inlet opening 27 (FIG. 9) in housing end cap 25 and here it passes between the pair 49 of webs (not shown) of the cap 25 that are aligned with the pair of ribs designated at 75 and passes to the first flow channel, designates at 78, traversed by the fluid in the arrangement. At the discharge end of the conditioner, channel 78 communicates with the space 79 (FIG. 7) in end cap 26 and reverses flow to then pass through the next channel designated at 80 (see FIG. 4). This flow process between the opposite ends of the treatment zone continues with the flow from channel 80 being diverted in end cap 25 to channel 81 and thereafter successively through channels 82, 83, 84, 85, 86 and thence to channel 87 from which the treated water passes between the pair 49 of webs of cap 26 and through the outlet opening 28. Here the water treated in the treatment zone 24 discharges into an outlet chamber 89, similar to chamber 77 to then discharge from the conditioner through fluid outlet port 13. The various channels 28 and 80 through 87 provided by the rib structure are laterally arranged to surround the array in the treatment zone 24 and as the flow path is traversed the water encounters the flux field of each magnet and the encrustating particles are subjected to differing polarities from differing directions, all of which facilitates the desired treatment.

Figure 13:
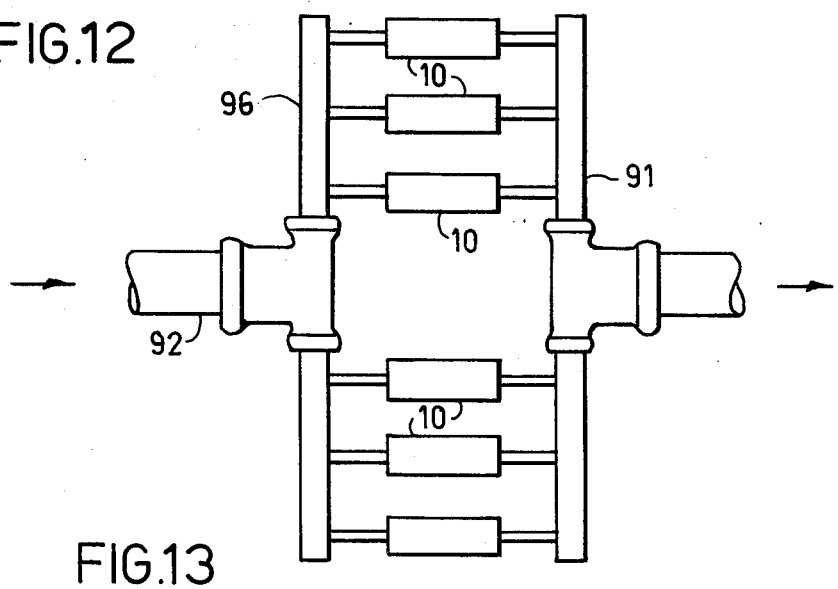
FIG. 13 illustrates a parallel arrangement of the water conditioners as tied into a delivery line with a flow exceeding the capacity of one of the units.

The advantages of the invention are several fold. For one, the basic design of the conditioner has utility in testing a water to be treated in that, without modification of the structural design of the water conditioner, a water to be treated may be subjected to various magnetic field arrangements in successive tests and all without modifications in a structural design that would otherwise impose variables upon the test system other than the flux field modifications. Thus, a given water to be treated may be tested by passing it at a pre-determined flow rate through a conditioner embodying the principles of the invention and having a predetermined orientation of the magnetic fields of the array, and an empirical determination may be made as to the effectiveness of the treatment in, for example, removing a predetermined amount of a scale from a pipe section previously coated by encounter with the untreated waters. Similar tests may be then run with different orientations of the magnetic fields until a determination is made as to the best orientation of the fields for the water being treated. With this information, the maximum effectiveness and capacity of the water conditioner having the structural features utilized in the test procedures may be ascertained and as such, the optimum design the field orientation of the magnets of conditioners delivered for use in the area of a source waters can be standardized to the fluid capacity involved in the test unit.

Where the flow rate at the insulation exceeds the fluid capacity of one water conditioning unit, several units 10, as indicated in FIG. 13, may be connected with predictable results in a parallel arrangement between a feed header 90 and discharge header 91 and connected in a pipe line 92 for conveying the source waters.

The basic arrangement of the magnets and the structure determining the path of flow throughout the treatment area 24, has the further advantage that without major modifications, the number of magnets 17 and residence time in the treatment zone under the flow conditions established by the inlet and outlet orfices of the conditioner, may be readily established for a source water by first establishing the best flux field arrangement for a conditioner of predetermined length and thereafter conducting tests with conditioners differing in dimension only in that they have lesser or greater lengths and hence, a lesser or greater numbers of the individual magnets so as to determine the optimum number of magnets and their orientation can be determined. The extruded component used in the housing of the magnet lends itself readily to this approach, for the lengths of the extrusions may be simply cut off at the desired lengths for each test and are readily adapted to receive the end caps for the housing. Similarly, the end caps are inexpensive to mold, and of course, are usable either at the fluid feed of discharge ends of the array. Thus, the length of the conditioner may be modified through the simple use of a longer or shorter pipe section, and a longer or shorter extrusion as the case may be, all without the need for expensive modification in the overall design.

I claim:

1. A water conditioner for magnetically treating calcarious waters comprising an elongated hollow casing having an inner wall and a longitudinal axis, an elongated array of magnets having opposite ends and being coaxially arranged within the casing and spaced apart from said inner wall to provide an annular water treatment zone in the space therebetween, a plurality of elongated parallel flow channels that are laterally arranged to surround said array in said treatment zone, each of said channels being arranged to extend between said opposite ends of the array and in parallel with said longitudinal axis, first means at one of said opposite ends defining a fluid inlet to said zone, second means at the other of said opposite ends defining a fluid outlet from said zone, said first and second means having return passageways that cooperate with said channels at said opposite ends to provide a fluid flow path in the treatment zone which extends between said fluid inlet and said fluid outlet and traverses each of said channels surrounding said array and in an arrangement such that the flow of fluid in adjacent channels is in opposite parallel directions, each of said magnets having diametrically oppositely facing pole faces of opposite polarities and a polar axis which is normal to said longitudinal axis, said casing being made of material having a high permeability and said channels being made of materials having a low permeability, whereby said casing provides a return path for flux generated by said array of magnets.

2. A water conditioner in accord with claim 1 wherein the polar axes of said magnets are arranged in parallel.

3. A water conditioner in accord with claim 1 wherein the polar axes of adjacent magnets in the array are angularly arranged.

4. A water conditioner in accord with claim 1 wherein the polar axes of the magnets of the array are arranged to provide a resulting helical field of the flux between said opposite ends.

5. A water conditioner in accord with claim 1 wherein said flow channels are provided by an extruded elongated hollow cylindrical plastic member having a plurality of integrally joined circumferentially spaced apart and radially extending ribs.

6. A water conditioner in accord with claim 1 wherein said first means and said second means are molded plastic members that are identical in shape.

7. A water conditioner in accord with claim 1 wherein said conditioner comprises a housing for said array which comprises an elongated extruded plastic member that includes an open ended hollow right cylindrical sheath which surrounds said array and a plurality of elongated circumferentially spaced apart ribs that are integrally joined to the sheath and project radially of the lateral surface of the sheath to provide said elongated parallel flow channels, said housing further comprising said first and said second means, and each of said first and second means having a boss that snugly fits in an end opening of said sheath.

8. A water conditioner for magnetically treating calcarious waters comprising an elongated hollow pipe section having a cylindrical inner wall and a longitudinal axis, an elongated cylindrical array of magnets having opposite ends and a cylindrical lateral surface extending between said opposite ends and being coaxially arranged within the pipe section and spaced apart from said inner wall to provide an annular water treatment zone in the space therebetween, each of said magnets being cylindrical and assembled in an end-to-end relation and having a diametric dimension which exceeds its height dimension, each of said magnets having a polar axis that is normal to said longitudinal axis and diametrically oppositely and outwardly facing pole faces, an elongated plastic component having an elongated open ended hollow right cylindrical sheath surrounding and contiguous with said lateral surface, said plastic component further having elongated ribs extending between the open ends of said sheath, said ribs being circumferentially spaced apart and projecting radially of said sheath to said inner wall to provide a plurality of parallel flow channels that surround said array and are in parallel with said longitudinal axis, and a pair of molded plastic end caps at said opposite ends, each of said end caps having an annular lateral wall section which is contiguous with said inner wall, a circular outer end wall section integrally joined to said lateral wall section, a boss integrally joined to said outer end wall section and received in an end opening of said sheath, and a plurality of webs, said boss being spaced apart from said annular lateral wall section and coaxially arranged to provide an annular space therebetween, said outer end wall section having an opening for the passage of fluid therethrough, and said webs including a pair of webs in the annular space and forming a fluid flow passageway connected with one of said channels and communicating with said opening, and webs in the annular space forming fluid flow passageways interconnecting adjacent pairs of said channels.

9. A water conditioner in accord with claim 8 wherein the polar axes of said magnets are parallel.

10. A water conditioner in accord with claim 8 wherein the polar axes of adjacent magnets in the array are angularly arranged.

11. A water conditioner in accord with claim 8 wherein the polar axes of the magnets of the array are arranged to provide a resulting helical field of flux between said opposite ends.

12. A water conditioner in accord with claim 8 wherein said magnet and said end caps have axially aligned openings and fastening means extending through said aligned openings clamping said magnet between the bosses of said end caps.

* * * * *